(12) United States Patent
Poulakis

(10) Patent No.: US 8,007,891 B2
(45) Date of Patent: Aug. 30, 2011

(54) FIXING DEVICE AND METHOD FOR PRODUCING THE SAME

(75) Inventor: Konstantinos Poulakis, Hildrizhausen (DE)

(73) Assignee: Gottlieb Binder GmbH & Co. KG, Holzgerlingen (DE)

( * ) Notice: Subject to any disclaimer, the term of this patent is extended or adjusted under 35 U.S.C. 154(b) by 758 days.

(21) Appl. No.: 11/794,961

(22) PCT Filed: Mar. 22, 2006

(86) PCT No.: PCT/EP2006/002624
§ 371 (c)(1),
(2), (4) Date: Jul. 10, 2007

(87) PCT Pub. No.: WO2006/105869
PCT Pub. Date: Oct. 12, 2006

(65) Prior Publication Data
US 2008/0083480 A1   Apr. 10, 2008

(30) Foreign Application Priority Data
Apr. 2, 2005 (DE) .......................... 10 2005 015 239

(51) Int. Cl.
*B29C 65/48* (2006.01)
(52) U.S. Cl. .......... 428/99; 29/428; 297/180.1; 428/126
(58) Field of Classification Search .................... 428/99, 428/126; 29/428; 297/180.1; 156/60, 349
See application file for complete search history.

(56) References Cited

U.S. PATENT DOCUMENTS

| | | | | |
|---|---|---|---|---|
| 4,847,933 A * | 7/1989 | Bedford | | 5/652.2 |
| 6,537,643 B1 * | 3/2003 | Poulakis | | 428/100 |
| 2003/0099811 A1 * | 5/2003 | Poulakis | | 428/126 |
| 2004/0245811 A1 * | 12/2004 | Bevan et al. | | 297/180.12 |
| 2005/0066505 A1 * | 3/2005 | Iqbal et al. | | 29/428 |
| 2005/0200179 A1 | 9/2005 | Bevan et al. | | |

FOREIGN PATENT DOCUMENTS

| | | |
|---|---|---|
| DE | 44 32 497 | 3/1996 |
| DE | 199 61 189 | 6/2001 |
| DE | 100 39 940 | 3/2002 |
| DE | 696 18 762 | 10/2002 |
| DE | 103 41 151 | 12/2004 |
| DE | 203 19 093 | 6/2005 |
| EP | 1 266 794 | 12/2002 |
| JP | 2000-0189281 | 7/2000 |
| WO | WO 2004/089689 | 10/2004 |

* cited by examiner

*Primary Examiner* — Brent O'Hern
(74) *Attorney, Agent, or Firm* — Roylance, Abrams, Berdo & Goodman, LLP

(57) ABSTRACT

A fixing device secures components, such as fan devices, heating devices and other air-conditioning devices, to padding foams of vehicle seats. A method produces the fixing device. The component has at least one adhesive fastening part (22) which, together with at least one corresponding adhesive fastening part (24) connected to the padding foam (12), forms a releasable adhesive fastening with which the component is held in a fixed manner in contact with the padding foam (12). The adhesive fastening formed then provides a releasable connection between the component and the foam.

13 Claims, 3 Drawing Sheets

FIXING DEVICE AND METHOD FOR PRODUCING THE SAME

FIELD OF THE INVENTION

The present invention relates to a fixing device for fixing components such as fans, heating units and other climate control units to padding foam parts of vehicle seats, and to a method for producing the same.

BACKGROUND OF THE INVENTION

Modern and comfortable vehicle seats increasingly require insert or attached parts such as fans, heating units and other air conditioning units (e.g., cooling loops) for proper climate control of the seat. If necessary, other components can be attached, such as seat recognition systems, acceleration sensors for airbag units, actuators as power transmission means and the like. It has already been suggested that speakers be integrated into the padding foam parts especially in the region of the headrests.

In all these solutions, generally recesses are cut into the already produced foam part, in a size corresponding to the installation size of the component as an insert part. To fasten the insert part in the foam, generally a special plastic cement is used which captively connects the insert part to the foam. For dismounting of the insert part from the foam, for example, to replace it with a new device in case of maintenance, separation, is possible only destructively, in which generally large parts of the foam material are torn out at the same time. This tearing results in the new installation becoming a problem. The plastic adhesives are often objectionable in processing so that the corresponding exhaust systems must be provided which in turn increase production costs.

SUMMARY OF THE INVENTION

An object of the present invention is to provide an improved and reliable attachment of the component in or on the foam, such that installation and maintenance processes are facilitated and the production costs for placing the components in foams can be reduced.

This object is basically achieved by a fastening device where the component has at least one adhesive fastener part forming a detachable adhesive fastener with at least one corresponding adhesive fastener part connected to the padding foam. The component is held stationary on the padding foam in contact. A detachable connection between the component and foam via the adhesive fastener is formed in this way and often referred to as the mark "Kletten® [hook and loop fastener]". The component in the initial outfitting can be connected to the foam and later replaced by a corresponding new component in maintenance and repair processes by hand with low engagement forces, without using special adhesives which may be environmentally harmful. By using adhesive fastener parts for attaching an insert part to an associatable foam, especially in the form of padding foam, the production costs can be reduced compared to the prior art adhesive treatment.

The object is also basically achieved by a production process that produces a receiving space in a foam molded part matched to the geometry of a receiving space in a foaming mold having magnetic insert parts to which the respective adhesive fastener part adheres. Via its back, a connection to the foam takes place. The interlocking parts located on the front remain at least for the most part free of foam. In this way, upon foaming in the foaming mold, the receiving or contact space for the component can be directly produced without later having to cut notches for recessing of the foam material, as in the prior art. This clearly helps reduce production costs.

In one preferred embodiment of the fastening device according to the present invention, the component is designed as an insert part enclosed at least partially by the foam. The adhesive fastener the insert part holds the component in the foam in the insert position in contact. In this way, the component can be accommodated in a space-saving manner in the foam material, preferably without protruding.

In an altered embodiment of the fastening device according to the present invention, preferably the component is designed as an attached part which by the adhesive fastener is at least partially in contact with the outside surface of the foam. Preferably, the attached part to the outside is equipped with a cover having at least one access opening. In this way the component can be placed from the outside on the padding foam material so that the thickness of the foam material can be kept small. Vehicle seats already in use can then be retrofitted with the required attached parts.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not to scale.

DETAILED DESCRIPTION OF THE INVENTION

Figure 1:
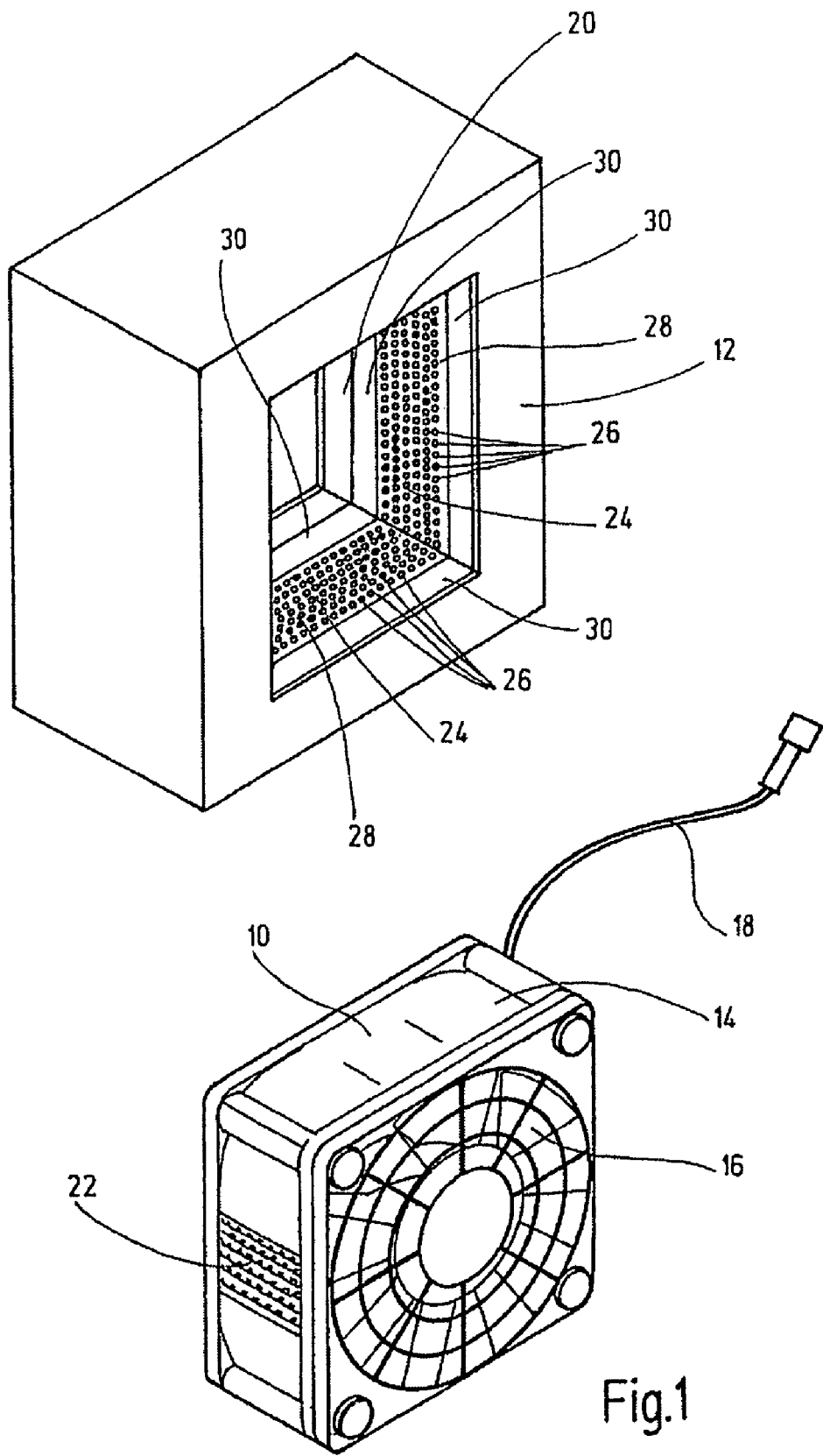
FIG. 1 is a perspective view of a fastening device according to a first exemplary embodiment of the invention with an insert part in the form of a fan unit and an associated foam part with a receiving space for the insert part to be inserted into the foam.

The first exemplary embodiment of a fastening device shown in FIG. 1 is used to fix insert parts in foams. As shown in FIG. 1, the insert part can be a fan unit 10 to be inserted into padding foam 12 of a vehicle seat (not detailed). The padding foam 12 as illustrated in FIG. 1 is shown essentially as a square block for the sake of simplicity, and therefore, constitutes only a sectional cutout from a larger padding foam part, as conventionally forms the seat part or the backrest part of a vehicle seat. The padding foam 12 is shown without covering material. The padding foams used in the regions of vehicle seats generally are formed of PU foam foamable into molded parts.

The fan unit 10 has a rectangular fan housing 14, preferably of plastic material, in which there is a fan wheel 16 driven by an electric motor (not detailed). This electric motor (not detailed) can be connected via an electrical connecting cable 18 to a power supply source (not detailed) for its operation. In the padding foam 12, a rectangular receiving space 20 is made which in terms of its geometry, especially its outside contour, is chosen to be somewhat larger than the outer periphery of the fan housing 14. The insert part in the form of the fan unit 10 should be enclosed in the installed state by the foam and conversely has at least one adhesive fastener part 22 in the form of a fleece or matted fiber material. This adhesive fastener part 22 in the installed state of the insert part with the corresponding adhesive fastener part 24 tightly connected to the foam 12 forms a detachable adhesive fastener also referred to as a "hook and loop fastener". By the two adhesive fastener parts 22, 24, a detachable fastening is formed, and, the insert part can be held stationary in the form of a fan unit 10 in the foam in the installation position.

As FIG. 1 furthermore shows, the respective adhesive fastener part 24 connected to the foam 12 is made larger in area than the associated adhesive fastener part 22 of the insert part, here in the form of a fan unit 10. In this way, increased connection reliability is achieved. In the embodiment, more adhesive fastener parts 22 are joined to the foam 12 than there are associated adhesive fastener parts 22 on the insert part. In particular, the receiving space 20 in one plane has adhesive fastener parts 24 diametrically opposite one another in pairs so that the receiving space 20 especially on its front end is provided with a total of four adhesive fastener parts 24. Conversely, the fan housing 14 has only two adhesive fastener parts 22 diametrically opposite one another. In this respect, this arrangement makes it possible to install the fan unit 10 in the receiving space 20 of the padding foam 12 in an optionally turned arrangement to the fan axis of the fan wheel 16.

The adhesive fastener part 24 of the foam 12 is formed of a microfastener part with individual interlocking elements 26 located on one side in the manner of interlocking mushrooms. They are located on a carrier strip 28 having a cover strip 30 on its back. In the illustrated embodiment, cover strip 30 projects on both sides over or beyond the respective free side edge regions of the carrier strip 28. The cover strip 30 is provided at least partially with ferromagnetic components or otherwise has a magnet means or components (not shown) with a function detailed below. These adhesive fastener parts 24 are disclosed in different embodiments in DE 100 39 940 and DE 103 41 152. Another embodiment is shown in DE 103 41 151.

For detachable installation of the fan unit 10 in the padding foam 12, the fan unit 10 is inserted by hand into the receiving space 20, with low actuation forces direct interlocking of the corresponding adhesive fastener parts 22, 24 to one another taking place. The fan unit 10 then need only be electrically connected to a supply source via the connecting cable 18 to ensure climate control of the foam 12 of a vehicle seat. For the dismounting process it is sufficient to again remove the fan unit 10 by releasing the adhesive fastener from the receiving space 20. Instead of the illustrated fan unit 10, a host of insert parts can be fixed on the foams 12 in this way. In addition to heating and other air conditioning units such as cooling loops, speakers, sensors, seat recognition systems, actuators and the like can be detachably anchored in foam parts of any type.

Figure 2:
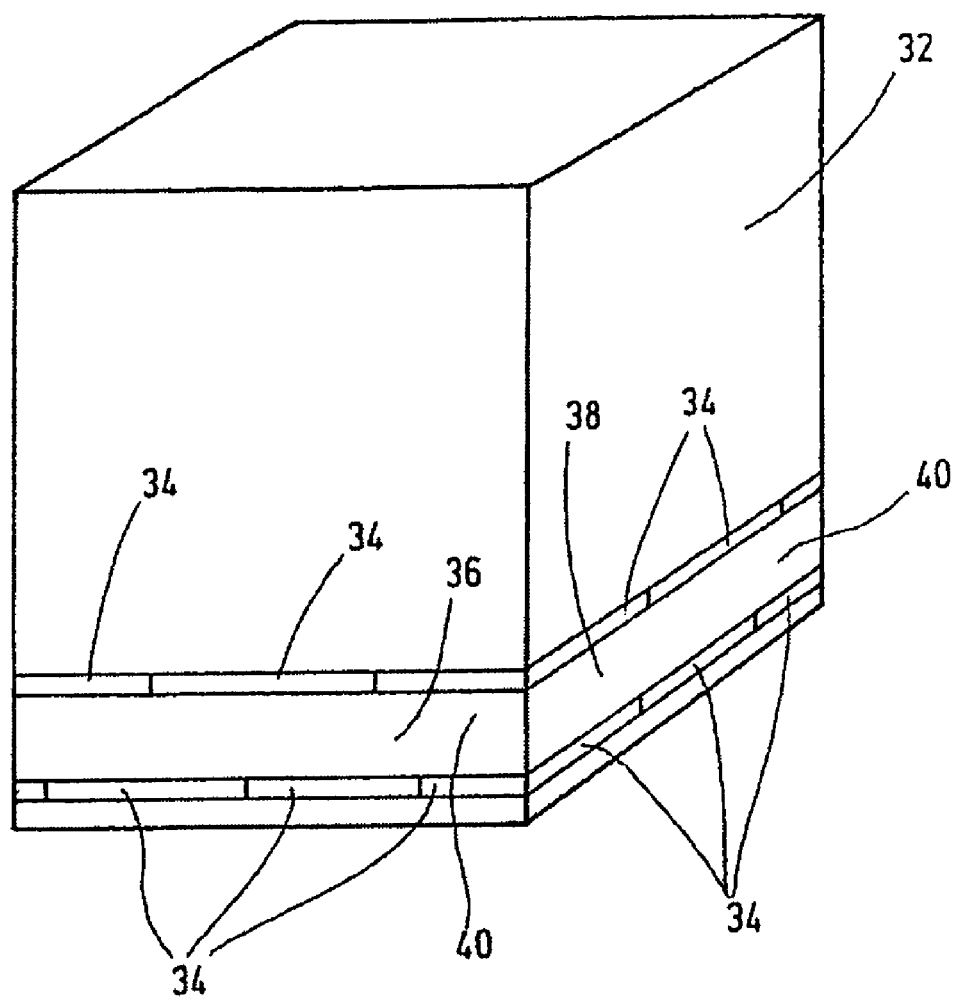
FIG. 2 is in a perspective top view a tool for producing the fastening device as shown in FIG. 1 according to an exemplary embodiment of the present invention.

To produce the receiving space 20 as shown in FIG. 1, the cubic molded part 32 shown in FIG. 2 is used. It can be inserted into a foaming mold (not detailed) for producing the padding foam 12. The molded part 32 in the direction of FIG. 2, on its bottom end has magnetic insert parts 34 insertable as magnetic bars into the metal block as a molded part 32. The respective adhesive fastener part 24 is then fixed on the respective holding regions 36, 38 such that the front with the interlocking elements 26 is in contact with the contact surface 40 of each holding region 36, 38 and the projecting edges of the cover strip 30 extend over the magnetic insertion parts 34 such that magnetic adhesion occurs and the interlocking elements 26 are sealed against penetration of foam material. If the padding foam 12 is then removed from the mold after the foaming process, the molded part 32 has produced the receiving space 20 and the respective cover strip 30 of the adhesive fastener part 24 is securely joined to the foam material along its back. The interlocking elements 26 project forward in the form of individual mushroom heads and are available for engaging the corresponding adhesive fastener part 22 on the respective insert part. It is within the scope of the present invention to provide the adhesive fastener parts 22 of the insert part in the padding foam 12 and the adhesive fastener parts 24 on the insert part. Mixed forms are also conceivable in which in one part both adhesive fastener parts 22 of one type and also adhesive fastener parts 24 of the other type are used.

Figure 3:
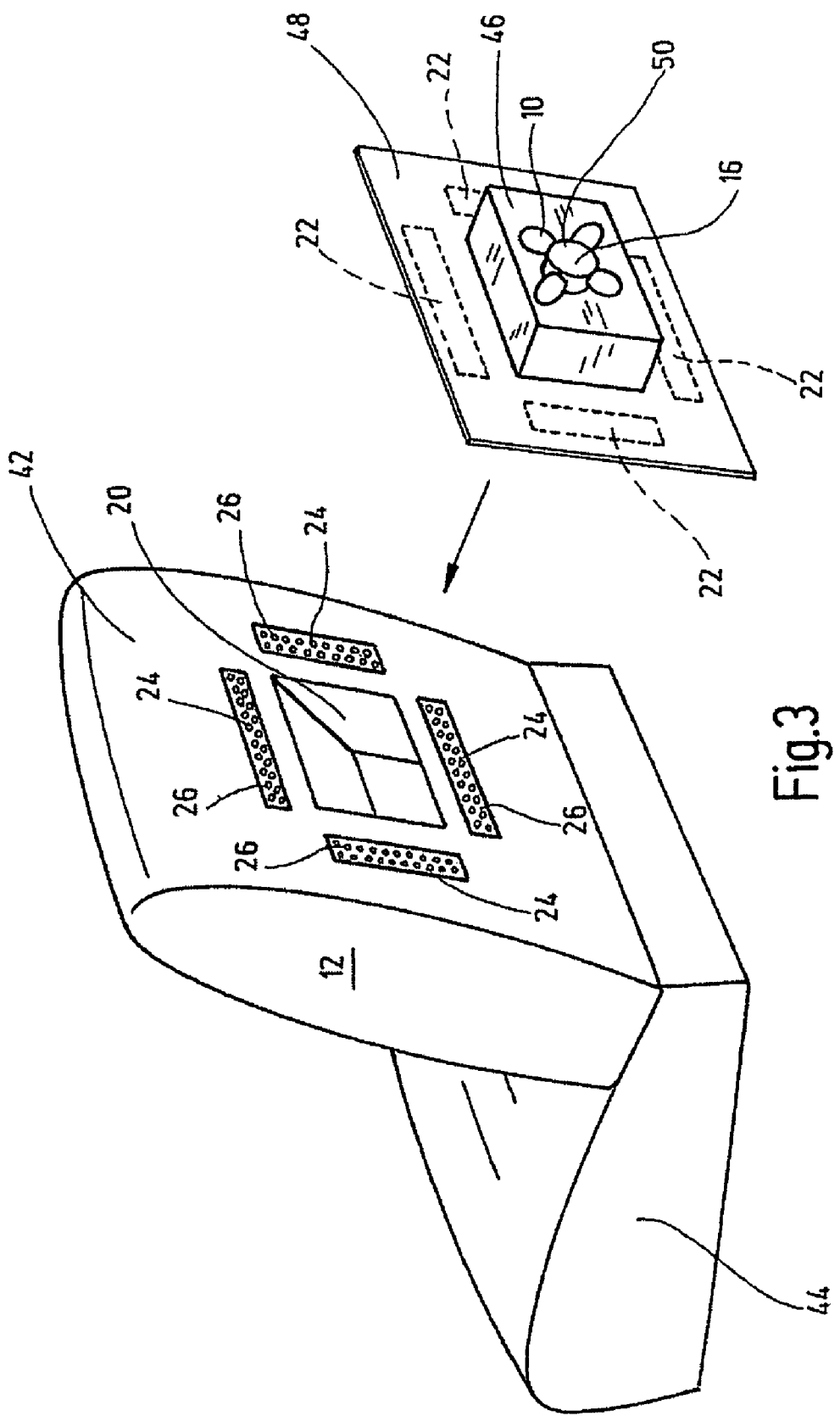
FIG. 3 is a perspective view of a fastening device according to a second exemplary embodiment of the present invention in which an attached part in the form of a fan unit can be placed from the outside on the foam part of a backrest.

The second embodiment shown in FIG. 3 is explained only to the extent that it differs significantly from the preceding or first embodiment. In this connection, the same components are provided with the same reference numbers, as in the preceding embodiment, and the statements made in this respect then also apply to the embodiment described below.

FIG. 3 shows a rear view of a backrest 42 connected forward to a conventional seat part 44 of a vehicle or aircraft passenger seat. These seat components are shown only schematically and in the form of padding foams 12. In the top third of the padding foam 12 of the backrest 42, an essentially rectangular receiving space 20 is encompassed to its outside at a distance by four individual, strip-shaped padding adhesive fastener parts or sections 24. They are in turn anchored with their back securely in the padding foam material 12, with their interlocking or mushroom elements 26 protruding to the outside clear of the padding foam material 12. The component to be attached in the form of a fan unit 10 is designed as an attached part and has a cover 46 enclosing the actual fan wheel 16 and discharges on the front side into a contact plate 48.

On the free front side of this rectangular, especially square contact plate 48, four adhesive fastener parts or sections 22 are arranged in a strip. In the attached position, these adhesive fastener parts 22 detachably form the respective adhesive fastener with the adhesive fastener parts 24 on the padding foam material 12. Preferably, the adhesive fastener parts 22 form a loop or matted fiber material. Fixing is in any case designed such that under a certain contact pressure the adhesive fastener parts 22, 24 interact strongly with one another and the edge-side foam material seals the pertinent contact such that air can flow unobstructed from the outside into the receiving space 20 via an access opening 50. To cover the back of the fan wheel 16, the pertinent fresh air supply can be provided on the edge side of the cover 46 (not shown). In this way, a component can also be connected later to the seat components from the outside. Furthermore, a padding coating material (not detailed) can enclose the attached fan system from the outside to eliminate the danger of possible injury.

The fastening device according to the present invention is versatile and can be produced especially advantageously. In particular, with the fastening device long-lasting use of foams is possible even if the components to be attached in the course of maintenance or repair processes would have to be changed more frequently.

While various embodiments have been chosen to illustrate the present invention, it will be understood by those skilled in the art that various changes and modifications can be made therein without departing from the scope of the present invention as defined in the appended claims.

What is claimed is:
1. A fixing arrangement, comprising:
a climate control unit having an outer side;

at least one unit adhesive fastener part fixed on said outer side of said control unit with unit fastener elements extending laterally outwardly;
a vehicle seat having foam padding having a receiving space formed therein defined by inside wall surfaces and conformed in shape to that of said control unit; and
at least one padding adhesive fastener part fixed on one of said inside wall surfaces with padding fastener elements extending inwardly into said receiving space, said unit fastener elements and said padding fastener elements being detachably coupled to hold said control unit releasably and stationary in said foam padding.

2. A fixing arrangement according to claim 1 wherein
said control unit is a fan unit with a drivable fan wheel surrounded by a rectangular housing and with said unit adhesive fastener part on at least two diametrically opposite sides of said rectangular housing.

3. A fixing arrangement according to claim 1 wherein
said control unit is at least partially enclosed in said foam padding.

4. A fixing arrangement according to claim 1 wherein
said padding adhesive fastener part is larger in area than unit fastener part.

5. A fixing arrangement according to claim 4 wherein
said padding fastener part is longer than said unit fastener part.

6. A fixing arrangement according to claim 1 wherein
additional padding fastener parts are provided in a number greater than a number of unit fastener parts.

7. A fixing arrangement according to claim 1 wherein
said padding fastener elements are mushroom fasteners; and
said unit fastener elements are a fleece or matted fiber material.

8. A fixing arrangement according to claim 1 wherein
said padding fastener part comprises a carrier strip from which said padding fastener elements extend and a cover strip forming a free side edge area extending beyond an adjacent longitudinal edge of said carrier strip, said cover strip having at least partially ferromagnetic properties.

9. A fixing arrangement, comprising:
a climate control unit having a cover with at least one access opening;
a contact plate on an outside surface of said cover and extending laterally outwardly from said cover, said contact plate having a seat contacting surface;
at least one unit adhesive fastener part fixed on said seat contacting surface of said contact plate spaced radially outwardly from said control unit, said unit adhesive fastener part having unit fastener elements extending away from said seat contacting surface;
a vehicle seat having a foam padding with a receiving space formed therein and a seat surface surrounding said receiving space; and
at least one padding adhesive fastener part fixed on said seat surface adjacent said receiving space and having padding fastener elements extending in a direction away from said vehicle seat, said unit fastener elements and said padding fastener elements being detachably coupled to hold said control unit releasably and stationary on said vehicle seat.

10. A fixing arrangement according to claim 9 wherein
said control unit is a fan unit with a drivable wheel surrounded by a rectangular housing and with said contact plate extending laterally outwardly from said rectangular housing.

11. A fixing arrangement according to claim 9 wherein
said padding fastener elements are mushroom fasteners; and
said unit fastener elements are a fleece or matted fiber material.

12. A fixing arrangement according to claim 9 wherein
said padding adhesive fastener part and said unit adhesive fastener parts each comprise a number of sections about said receiving space and said control unit, respectively, in mating patterns.

13. A process for producing a fixing arrangement, comprising the steps of:
placing a mold part matched to a geometry of a receiving space in a foaming mold for forming a foam padding;
attaching a padding adhesive fastener part to an outside surface of the mold part by magnetic insert parts on the mold part and ferromagnetic properties of the padding adhesive fastener part, the padding adhesive fastener part having padding fastener elements extending toward said mold part to remain substantially free of foam material;
molding the foam material between the molded part and the foaming mold so as to form a vehicle seat foam padding with the receiving space and with the padding fastener elements extending inwardly into the receiving space upon removal of the foam padding from the mold part and foaming mold;
fixing a unit adhesive fastener part on an outer side of a climate control unit with unit fastener elements extending laterally outward and with the control unit having a shape conforming to that of the receiving space; and
detachably coupling the fastener elements of the padding adhesive fastener part and the unit adhesive fastener part to hold the control unit releasably and stationary in the foam padding.

* * * * *